US010855529B2

(12) United States Patent
    Colombo

(10) Patent No.: US 10,855,529 B2
(45) Date of Patent: Dec. 1, 2020

(54) PROCESSING SYSTEM, RELATED INTEGRATED CIRCUIT, DEVICE AND METHOD

(71) Applicant: STMicroelectronics Application GmbH, Aschheim-Dornach (DE)

(72) Inventor: Roberto Colombo, Munich (DE)

(73) Assignee: STMicroelectronics Application GmbH, Aschheim-Dornach (DE)

( * ) Notice: Subject to any disclaimer, the term of this patent is extended or adjusted under 35 U.S.C. 154(b) by 0 days.

(21) Appl. No.: 16/679,796

(22) Filed: Nov. 11, 2019

(65) Prior Publication Data

US 2020/0169459 A1    May 28, 2020

(30) Foreign Application Priority Data

Nov. 26, 2018 (IT) .................. 102018000010584

(51) Int. Cl.
| | |
|---|---|
| *H04L 12/24* | (2006.01) |
| *H03K 19/1776* | (2020.01) |
| *H04L 29/06* | (2006.01) |
| *H04L 29/08* | (2006.01) |

(52) U.S. Cl.
    CPC ..... *H04L 41/0803* (2013.01); *H03K 19/1776* (2013.01); *H04L 29/06* (2013.01); *H04L 69/329* (2013.01)

(58) Field of Classification Search
    None
    See application file for complete search history.

(56) References Cited

U.S. PATENT DOCUMENTS

| | | | | |
|---|---|---|---|---|
| 7,103,682 B2* | 9/2006 | Meyer | ............ | G06F 30/30 710/8 |
| 7,257,750 B1* | 8/2007 | Singh | ............ | G11C 29/42 714/732 |
| 7,293,204 B2* | 11/2007 | Lu | ............ | G06F 13/4226 714/44 |
| 7,652,500 B1* | 1/2010 | Tang | ............ | H03K 19/17764 326/38 |
| 7,759,968 B1* | 7/2010 | Hussein | ............ | H03K 19/17764 326/38 |

(Continued)

FOREIGN PATENT DOCUMENTS

| | | |
|---|---|---|
| EP | 3401183 A1 | 11/2018 |
| WO | 2014125326 A1 | 8/2014 |

*Primary Examiner* — Backhean Tiv
(74) *Attorney, Agent, or Firm* — Slater Matsil, LLP

(57) ABSTRACT

A hardware configuration circuit can sequentially read data packets from a non-volatile memory. For a first data packet, the circuit is configured to store the configuration data and the address included in the data packet in the register, select a target configuration data client circuit as a function of the address included in the first data packet, transmit a first data signal that includes the configuration data included in the first data packet to the target configuration data client circuit, receive a second data signal that includes configuration data stored in the target configuration data client circuit and the address associated with the target configuration data client circuit, and compare the configuration data and address received from the target configuration data client circuit with the configuration data and address stored in the register.

20 Claims, 8 Drawing Sheets

(56) References Cited

U.S. PATENT DOCUMENTS

| | | | | |
|---|---|---|---|---|
| 8,085,584 B1* | 12/2011 | Kale | ............... | G11C 13/0069 365/163 |
| 8,108,754 B1* | 1/2012 | Tang | ............... | H03K 19/17764 714/758 |
| 8,166,341 B2* | 4/2012 | DeHaan | ............... | G06F 11/2247 714/21 |
| 10,289,498 B2* | 5/2019 | Yoshida | ............... | G06F 11/1076 |
| 2002/0116587 A1* | 8/2002 | Modelski | ............... | G06F 13/36 711/154 |
| 2003/0088805 A1* | 5/2003 | Majni | ............... | G06F 11/328 714/5.1 |
| 2004/0025086 A1* | 2/2004 | Gorday | ............... | G01R 31/317 714/37 |
| 2004/0153923 A1* | 8/2004 | Goel | ............... | G06F 11/1008 714/724 |
| 2006/0259744 A1* | 11/2006 | Matthes | ............... | G06F 15/7867 712/220 |
| 2008/0024163 A1* | 1/2008 | Marui | ............... | G06F 15/7867 326/39 |
| 2009/0063865 A1* | 3/2009 | Berenbaum | ............... | H04L 9/3247 713/180 |
| 2009/0138770 A1* | 5/2009 | Nakaya | ............... | G01R 31/318516 714/725 |
| 2009/0261857 A1* | 10/2009 | Marshall, Jr. | ............... | G11C 5/005 326/38 |
| 2010/0260476 A1* | 10/2010 | Cloutman | ............... | H04N 5/913 386/248 |
| 2013/0262958 A1* | 10/2013 | Ruggiero | ............... | G06F 11/1048 714/763 |
| 2014/0157043 A1* | 6/2014 | Ruggiero | ............... | G06F 11/1048 714/6.2 |
| 2016/0155515 A1* | 6/2016 | Son | ............... | G11C 29/4401 714/719 |
| 2016/0266964 A1* | 9/2016 | Uekusa | ............... | H03K 19/17764 |
| 2018/0107538 A1* | 4/2018 | Grabowski | ............... | G06F 11/1044 |
| 2019/0258493 A1* | 8/2019 | Colombo | ............... | H04L 9/0643 |
| 2020/0169459 A1* | 5/2020 | Colombo | ............... | H04L 69/329 |
| 2020/0225872 A1* | 7/2020 | Barnes | ............... | G06F 12/1466 |

* cited by examiner

PROCESSING SYSTEM, RELATED INTEGRATED CIRCUIT, DEVICE AND METHOD

CROSS-REFERENCE TO RELATED APPLICATIONS

This application claims priority to Italian Patent Application No. 102018000010584, filed on Nov. 26, 2018, which application is hereby incorporated herein by reference.

TECHNICAL FIELD

Embodiments of the present disclosure relate to processing systems and related integrated circuits, devices and methods.

BACKGROUND

FIG. 1 shows a typical electronic system, such as the electronic system of a vehicle, comprising a plurality of processing systems 10, such as embedded systems or integrated circuits, e.g., a Field Programmable Gate Array (FPGA), Digital Signal Processor (DSP) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to a vehicle control bus via a gateway. Typically, the processing systems 10 are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

Future generations of processing systems, in particular micro-controllers dedicated to automotive applications, will exhibit a significant increase in complexity, mainly due to the increasing number of functionalities (such as new protocols, new features, etc.) and to the tight constraints concerning the operation conditions of the system (such as lower power consumption, increased calculation power and speed, etc.).

FIG. 2 shows a block diagram of an exemplary digital processing system 10, such as a micro-controller, which may be used as any of the processing systems 10 of FIG. 1.

In the example considered, the processing system 10 comprises at least one processing unit 102, such as a microprocessor, usually the Central Processing Unit (CPU), programmed via software instructions. Usually, the software executed by the processing unit 102 is stored in a program memory 104a, such as a non-volatile memory, such as a Flash memory or EEPROM. Generally, the memory 104a may be integrated with the processing unit 102 in a single integrated circuit, or the memory 104a may be in the form of a separate integrated circuit and connected to the processing unit 102, e.g. via the traces of a printed circuit board. Thus, in general the memory 104a contains the firmware for the processing unit 102, wherein the term firmware includes both the software of a micro-processor and the programming data of a programmable logic circuit, such as a FPGA.

In the example considered, the processing unit 102 may have associated one or more resources 106, such as:

- one or more communication interfaces, such as Universal asynchronous receiver/transmitter (UART), Serial Peripheral Interface Bus (SPI), Inter-Integrated Circuit (I$^2$C), Controller Area Network (CAN) bus, Ethernet, and/or debug interfaces; and/or
- one or more analog-to-digital and/or digital-to-analog converters; and/or
- one or more dedicated digital components, such as hardware timers and/or counters, or a cryptographic co-processor; and/or
- one or more analog components, such as comparators, sensors, such as a temperature sensor, etc.; and/or
- one or more mixed signal components, such as a PWM (Pulse-Width Modulation) driver.

Accordingly, the digital processing system 10 may support different functionalities. For example, the behavior of the processing unit 102 is determined by the firmware stored in the memory 104a, e.g., the software instructions to be executed by a microprocessor 102 of a micro-controller 10. Thus, by installing a different firmware, the same hardware (micro-controller) can be used for different applications. Often, the behavior of the processing system 10 may also be varied based on configuration data CD. For example, these configuration data CD may be written into specific areas of the non-volatile program memory 104a and retrieved when the processing system 10a is powered on.

Alternatively or in addition, the configuration data CD may be stored in an additional non-volatile memory 104b, such as a one-time programmable (OTP) memory, e.g. implemented with fuses. For example, the program memory 104a may be used, in case the blocks shown in FIG. 2 are integrated in a common integrated circuit. Conversely, an additional non-volatile memory 104b may be used, in case the program memory 104a is an external memory, and only the other blocks are integrated in a common integrated circuit. Accordingly, generally, the configuration data CD are stored in a non-volatile memory (104a and/or 104b) of the integrated circuit comprising the blocks requiring configuration data, such as the processing unit 102 and/or one or more of the hardware resources 106.

For example, such configuration data CD are often calibration data used to guarantee that the hardware behavior is uniform, thereby compensating possible production process tolerances. For example, this applies often to the calibration of analog components of the processing system, such as a temperature sensor, analog-to-digital converter, voltage reference, etc. For example, a voltage monitor threshold level of an analog comparator could be "trimmed" to the exact intended value by adjusting some levels with configuration/calibration data, which are written by the producer of the hardware of the processing systems, e.g. the micro-controller producer.

Moreover, the configuration data CD may also be used to customize the behavior of the hardware, e.g., the hardware resources 106, according to different application needs. For example, once the firmware of the processing system 10 has been stored in the processing system 10, some configuration data may be written in order to deactivate the debug interface, which e.g. could be used to download the firmware of the processing system 10.

The processing system may also be configured to permit that a first part of the configuration data CD is written by the producer of the hardware of the processing system (e.g., the producer of an integrated circuit), and a second part of the configuration data CD is written by the developer of the firmware of the processing system 10.

Typically, the programmed configuration data CD are read during a reset phase, which usually starts as soon as the processing system 10 is powered on. Specifically, as shown in FIG. 2, the processing system 10 may comprise for this purpose a configuration circuit 108 configured to read the configuration data CD from the non-volatile memory 104a and/or 104b, and distribute these configuration data CD within the processing system 10.

SUMMARY

Embodiments of the present disclosure relate to processing systems, such as micro-controllers, having associated a memory in which configuration data are stored.

Various embodiments of the present disclosure can provide solutions for monitoring the correct operation of the blocks involved during the configuration of the processing system.

As mentioned before, various embodiments of the present description relate to a processing system. In various embodiment, the processing system comprises a plurality of configuration data client circuits. Each configuration data client circuit comprises a register, wherein each configuration data client circuit is associated a respective address.

Specifically, in various embodiments, each configuration data client circuit is configured to receive via a first data signal configuration data addressed to the address associated with the configuration data client circuit and store the configuration data received in the register of the configuration data client circuit. Thus, at least one hardware circuit may be configured to change operation as a function of the configuration data stored in the registers of the plurality of configuration data client circuits. In various embodiments, at least one of the configuration data client circuits may comprise a register implemented with a plurality of redundant flip-flops or latches.

In various embodiment, the processing system comprises also a non-volatile memory comprising the configuration data for the at least one hardware circuit, and a hardware configuration circuit configured to read the configuration data from the non-volatile memory and transmit the configuration data via the first data signal to the plurality of configuration data client circuits.

Specifically, in various embodiments, the configuration data are stored in the non-volatile memory in the form of data packets comprising an address of a configuration data client circuit selected from the plurality of configuration data client circuits and the respective configuration data to be transmitted to the selected configuration data client circuit. Accordingly, the hardware configuration circuit may sequentially read the data packets from the non-volatile memory, select a target configuration data client circuit as a function of the address included in the data packet, and transmit the configuration data included in the data packet to the selected target configuration data client circuit.

For example, in various embodiments, the hardware configuration circuit comprises a data read circuit configured to sequentially read the data packets from the non-volatile memory. Moreover, the hardware configuration circuit may comprise a dispatch circuit configured to select the target configuration data client circuit as a function of the address included in the data packet, and transmit the configuration data included in the data packet to the target configuration data client circuit.

Specifically, in various embodiments, the dispatch circuit may transmit the configuration data included in the data packet to the target configuration data client circuit by applying the address included in the data packet to an address signal, and setting a write enable signal. Accordingly, when the write enable signal is set, the selected configuration data client circuit may store the configuration data received via the first data signal in the respective register. For example, each configuration data client circuit may be configured to receive configuration data addressed to the address associated with the configuration data client circuit by comparing the address signal with a reference address signal identifying the address associated with the configuration data client circuit, setting an address verification signal when the comparison indicates that the address signal corresponds to the reference address signal, and storing the configuration data received in the register of the configuration data client circuit when the write enable signal and the address verification signal are set.

As will be described in greater detail in the following, the data read circuit may be operated in response to a first control signal and the dispatch circuit may transmit the configuration data and set the write enable signal in response to a second control signal. Thus, in various embodiments, even though reading configuration data from the non-volatile memory, the configuration data may be stored only selectively (as a function of the second control signal) to the configuration data client circuits. For example, in various embodiments, the first and second control signal are generated by a state control circuit, e.g. as a function of a reset signal.

Accordingly, in general, the configuration data included in the data packets are sequentially transmitted to the configuration data clients.

In various embodiments, each configuration data client circuit comprises a transmitter circuit configured to transmit via a second data signal the configuration data stored in the respective register and the address associated with the configuration data client circuit to the hardware configuration circuit. For example, in various embodiments, the transmitter circuit is configured to transmit the configuration data stored in the respective register and the address associated with the configuration data client circuit as a function of the address verification signal.

In various embodiments, the hardware configuration circuit may thus be configured to perform the following operations for at least one of the data packets:
 a) storing the configuration data and the address included in the data packet in a further register,
 b) selecting a target configuration data client circuit as a function of the address included in the data packet,
 c) transmitting via the first data signal the configuration data included in the data packet to the target configuration data client circuit,
 d) receiving via the second data signal the configuration data stored in the register of the target configuration data client circuit and the respective address associated with the target configuration data client circuit,
 e) comparing the configuration data and address received from the target configuration data client circuit with the configuration data and address stored in the further register, respectively, and
 f) in response to the comparison, generating an error signal when the configuration data and address received from the target configuration data client circuit do not correspond to the configuration data and address stored in the further register.

Accordingly, the hardware configuration circuit may verify whether the target configuration data client circuit has stored the correct configuration data.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
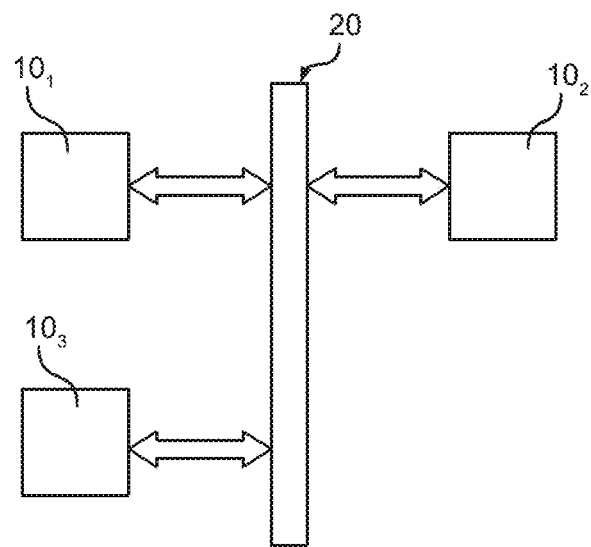
FIG. 1 shows a typical electronic system.
Figure 2:
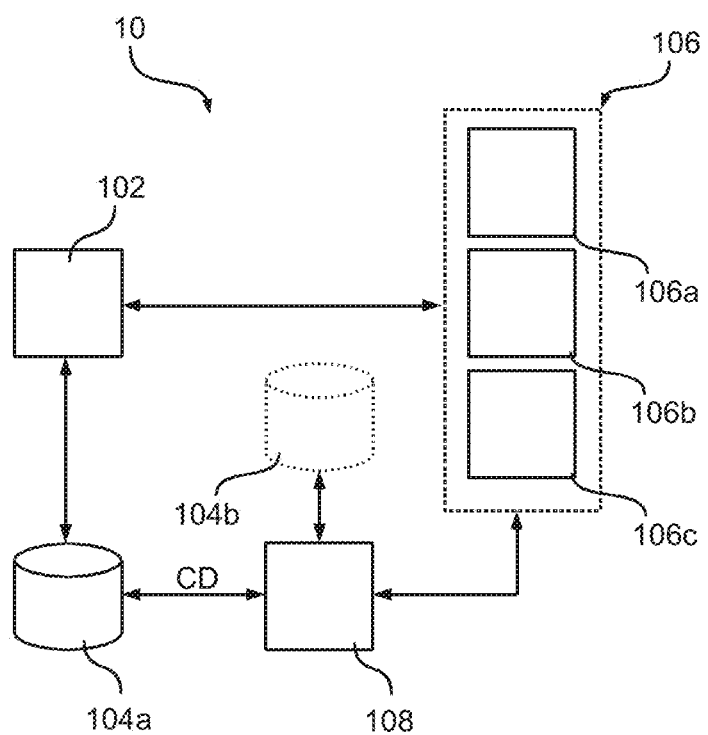
FIG. 2 shows a processing system comprising a configuration circuit.

In the following FIGS. 3 to 11 parts, elements or components which have already been described with reference to FIGS. 1 and 2 are denoted by the same references previously used in such Figures; the description of such previously described elements will not be repeated in the following in order not to overburden the present detailed description.

As described in the foregoing, the hardware of a processing system may be configurable by means of a set of configuration data, i.e. parameters which are (e.g. permanently) stored in a non-volatile memory.

Figure 3:
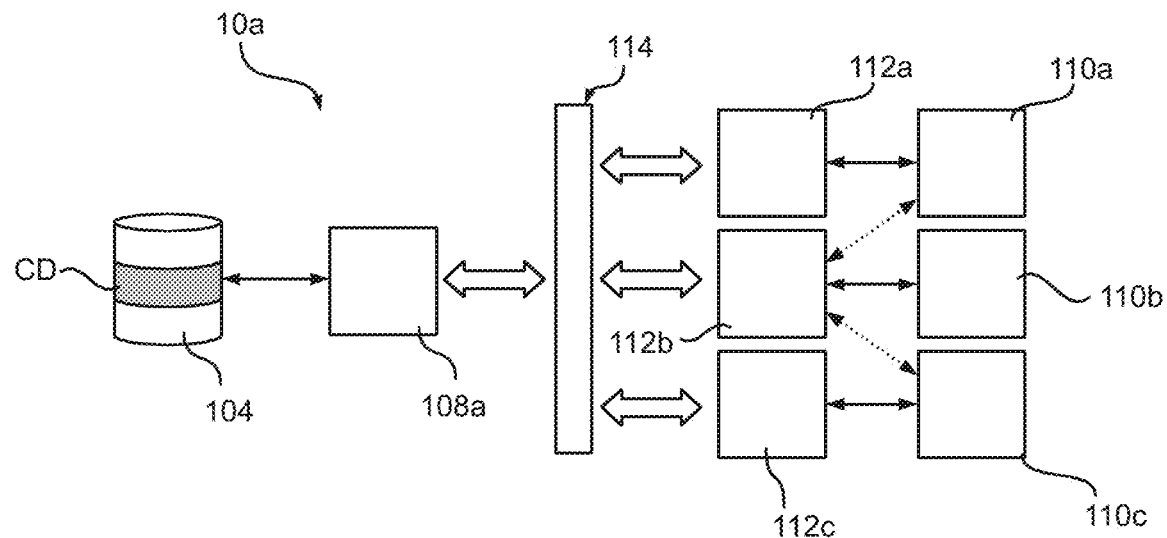
FIG. 3 shows an embodiment of a processing system comprising a non-volatile memory having stored configuration data, a configuration circuit and configuration data client circuits.

For example, FIG. 3 shows a possible embodiment for distributing such configuration data CD in a processing system 10a. Generally, the processing system 10a may have the same basic architecture of the processing system 10 described with respect to FIG. 2. Accordingly, the description of FIGS. 1 and 2 applies in its entirety also to the processing system 10a of FIG. 3.

In the embodiment considered, one or more configuration data CD are stored in one or more non-volatile memories 104 (i.e., memories 104a and/or 104b). For example, in various embodiments, these configuration data CD are stored in reserved memory areas, e.g. in the form of a plurality of consecutive memory locations.

Accordingly, in the embodiment considered, the configuration circuit 108a accesses the reserved memory areas containing the configuration data CD, reads the configuration data CD and transmits the configuration data CD to a respective block 110 within the processing system 10a. Generally, the block 110 may correspond to any block of the processing system 10a requiring configuration data and may correspond to the processing unit 102, a hardware resource 106, or even a memory (e.g. the memory 104a). For example, the block 110 may be a debug interface of the processing system 10a, which is enabled or disabled based on the configuration data CD. Similarly, the configuration data CD may be used to configure read and/or write protected areas of a memory.

In the embodiment, each block 110 has associated a respective configuration data client circuit 112. For example, in FIG. 3 are shown three blocks 110a, 110b and 110c and three configuration data client circuits 112a, 112b and 112c. Generally, each configuration data client circuit 112 may be associated univocally to a single hardware block 110, and provided configuration data only to the associated hardware block 110, e.g. a specific hardware resource 106, or may be associated with a plurality of hardware blocks 110, e.g. a plurality of hardware resource 106. In general, the configuration data client circuits 112a, 112b and 112c may also be integrated in the respective block 110a, 110b and 110c.

Accordingly, in the embodiment considered, the configuration circuit 108a may determine for each target block 110 to be configured the respective configuration data (selected from the configuration data CD) and transmit the configuration data associated with the target block 110 to the configuration data client circuit 112 associated with the target block 110. Similarly, while reading the configuration data CD from the memory 104, the configuration circuit 108a may determine the target block(s) for the current configuration information and send the current configuration data to the configuration data client circuit(s) associated with the respective target block(s). Generally, any communication may be used for transmitting the configuration data to the configuration data client circuit 112, including both serial and parallel communications. For example, the configuration circuit 108a and the configuration data client circuits 112 may be connected via a bus 114, and each configuration data client circuits 112 may have associated a respective target address.

Accordingly, each configuration data client circuit 112 is configured to receive the configuration data from the circuit 108a, store them into the internal register, e.g. store them into one or more internal flip-flops or latches. The data stored in the register may then be used to generate one or more signals, which influence the behavior of one or more hardware blocks 110.

Figure 4:
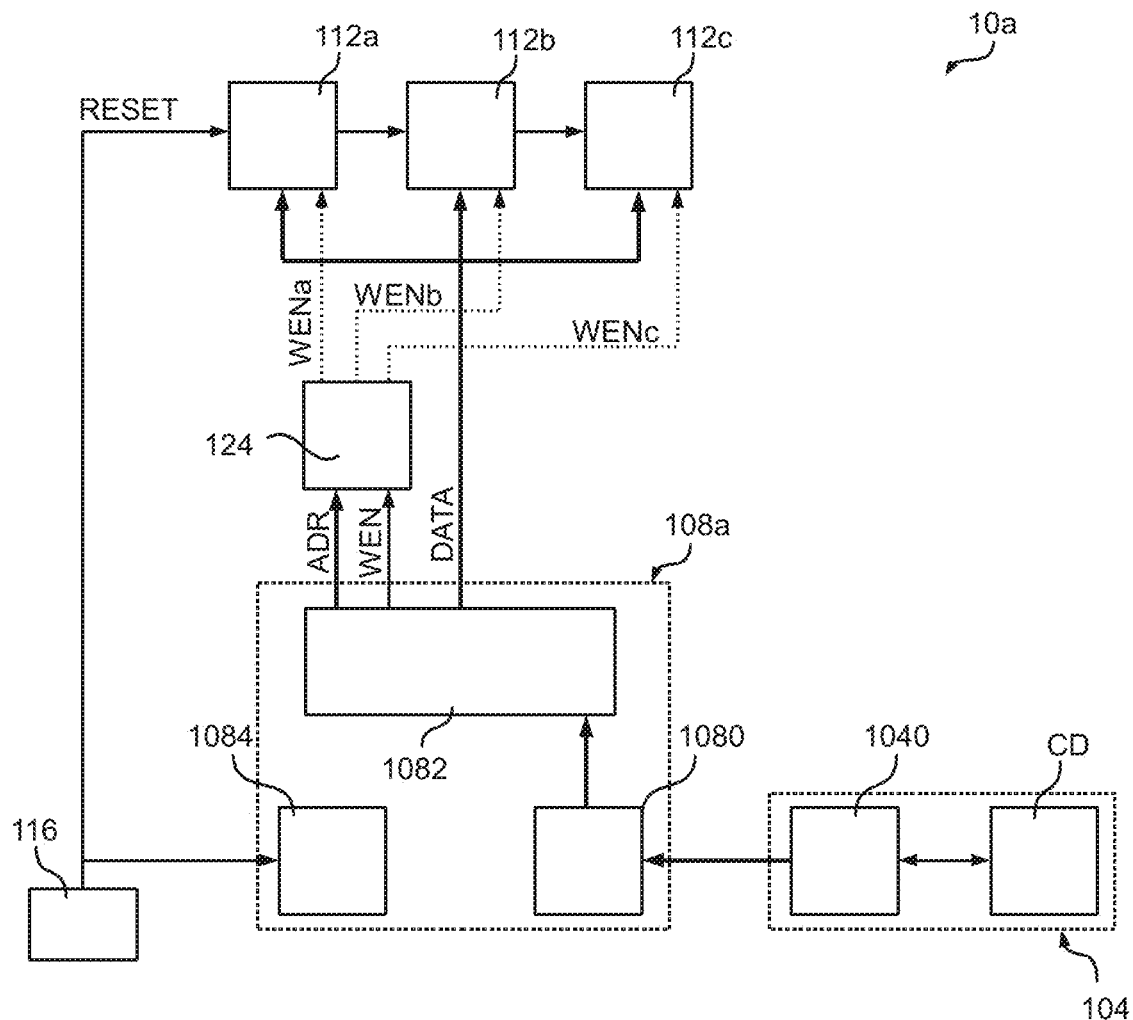
FIG. 4 shows an embodiment of the processing system of FIG. 3.

FIG. 4 shows in this respect a possible embodiment of the communication between the configuration circuit 108a and the configuration data client circuits 112.

Specifically, also in this case, the processing system 10a comprises a configuration circuit 108a configured to read the configuration data CD from one or more non-volatile memories 104 (e.g., memories 104a and/or 104b) and a plurality of configuration data client circuits 112 configured to receive respective configuration data from the circuit 108a and distribute them among a plurality of blocks 110 (not shown) requiring configuration data. For example, as mentioned before, each configuration data client circuit 112 may be associate univocally with a respective block 110. For example, in the embodiment considered, the processing system 10a comprises again three configuration data client circuits 112a, 112b and 112c.

In the embodiment considered, the configuration circuit 108a comprises a data read circuit 1080 configured to read the configuration data CD from the memory 104 and a dispatch circuit 1082 configured to transmit the configuration data to the configuration data client circuits 112.

Generally, any communication may be used for communication between the dispatch circuit 1082 and the configuration data client circuits 112.

For example, in various embodiments, the communication between the dispatch circuit 1082 and the configuration data client circuits 112 is based on data frames in accordance with a given format, called in the following Device Configuration Format (DCF). For example, in various embodiments, each data frame comprises two fields: the payload (i.e., the real data), called DCF Format payload, and possible additional data attributes used to identify the receiver of the data, called DCF Format attributes, wherein the receiver is one of the configuration data client circuits 112 representing a DCF client. For example, the data attributes may consist in 16 or 32 bits, wherein a given number of bits specifies the address of one of the configuration data client circuits 112, and the payload may consist in 16 or 32 bits. For example, in various embodiments, the data read circuit 1080 is configured to read blocks of 64 bits from the memory 104, wherein the first 32 bits contain the data attributes (including the address of a configuration data client circuit) and the second 32 bits contain the configuration data to be transmitted to the address specified in the data attributes.

In the embodiment considered, each configuration data client circuit/DCF client 112 is a hardware module, usually comprising a combinational circuit configured to store the received data in an internal register implemented, e.g., with flip-flops or latches, thereby permitting to distribute, via one or more internal signals generated as a function of the data stored in the internal register, the configuration data received to various pails of the associate hardware block(s) 110. For example, as mentioned before, each configuration data client circuit 112 may have associated a univocal address (i.e., univocal within each processing system 10a) and analyses the data transmitted by the dispatch circuit 1082 in order to determine whether the additional data attributes (DCF Format attributes) contain the address associated with the configuration data client circuit 112.

For example, as mentioned before, the configuration data CD may also comprise security configuration data used to activate or deactivate given security functions of the processing system 10a, such as the external access to a debug interface or the (read and/or write) access to given memory locations, etc.

In this case, a first configuration data client circuit 112 may store configuration data CD, which signal to a memory of the processing system 10a, such as the memory 104, whether to enable or disable a write and/or read protection associated with one or more memory blocks of the memory. Similarly, a second configuration data client circuit 112 may store configuration data used to generate a signal controlling the access to a debug interface. Specifically, the associated blocks 110 do not use directly the configuration data CD stored in the non-volatile memory 104 but the configuration data stored in the respective configuration data client circuit 112.

In various embodiments, the circuit 108a may also comprises a state control circuit 1084 configured to manage the various configuration phases of the processing system 10a. For example, in various embodiments, once the processing system 10a is switched-on, a reset circuit 116 of the processing system 10a may generate a reset signal RESET, which is used to perform a reset of the various components of the processing system 10a. For example, the reset signal RESET may correspond to a reset pulse of a given number of clock cycles, provided to the blocks 110 of the processing system 10a. For example, in the embodiment considered, the reset signal RESET may be used by the configuration data client circuits 112 in order to set the internal register to a given reset value. Similarly, in response to a reset, the state control circuit 1084 may activate the configuration phase. Specifically, during the configuration phase, the data read circuit 1080 may read the configuration data CD from the memory 104 and the dispatch circuit 1082 may send the configuration data CD to the various configuration data client circuits 112, thereby overwriting the reset values.

Accordingly, as mentioned before, the configuration data CD may be stored as data packets/DCF frames in one or more reserved memories of at least one non-volatile memory 104. Generally, the configuration data programmed to the non-volatile memory 104 may not include necessarily configuration data CD for all configuration data client circuits 112 but only the configuration data CD which are different from the default/reset values.

For example, as mentioned in the foregoing, the configuration data CD may comprise several sub-sets of configuration data:

a first group of configuration data (e.g., calibration data) written by the producer of the processing system 10a, e.g. the chip manufacture; and a second group of configuration data written during a later stage, such as configuration data written by the firmware developer and/or a system integrator, such as the producer of an Engine Control Unit (ECU).

Generally, these groups of configuration data may be written to different areas of the memory(ies) 104, thereby permitting that these groups may be configured independently. Conversely, in various embodiments a single non-volatile memory 104 is used and the data packets/DCF frames may be stored consecutively one after the other. For example, the producer of the processing system 10a may store a first set of configuration data CD to the non-volatile memory and a software developer may store a second set of configuration data to the non-volatile memory by appending the new configuration data to the first set of configuration data. Similarly, also the system developer, e.g. the producer of an ECU, may set a third set of configuration data by appending further configuration data to the second set of configuration data.

In the embodiment considered, the configuration circuit 108a reads these data packets/DCF frames from the non-volatile memory 104 during the configuration phase, e.g. as controlled by the state control circuit 1084. Specifically, in various embodiments, the configuration circuit 108a, in particular the data read circuit 1080, starts the read operation from a start address of the memory 104 (which may be fixed or programmable) and continuous the reading operation until the last data packets/DCF frame has been read from the non-volatile memory 104. Generally, the data read circuit 1080 may also access a plurality of non-volatile memories 104, or generally a plurality of memory areas which may belong to one or more non-volatile memories 104. For example, a first memory area may be programmable only by the producer of the processing unit 10a and a second memory area may be programmable by the software and/or system developer.

In the embodiment considered, each data packet/DCF frame read from the non-volatile memory 104 is provided to the dispatch circuit 1082, which forwards the configuration data CD included in the data packet/DCF frame, in particular the payload, to a respective configuration data client circuit 112. Specifically, in the embodiment considered, the dispatch circuit 1082 is configured to generate a data signal DATA having a given number of bits containing the configuration data to be transmitted to a given configuration data client circuit 112 and further control signals for selecting the target configuration data client circuit 112. For example, in the embodiment considered, the dispatch circuit 1082 generates also an address signal ADR containing the address of the target configuration data client circuit 112 and optionally a data valid signal WEN used to signal that the address signal ADR and the data signal DATA are valid. Thus, the data valid signal WEN essentially corresponds to a write enable signal. For example, in various embodiments, the address signal ADR (and the data valid signal WEN) may be provided to an address decoder 124 configured to activate one of the configuration data client circuits 112 as a function of the address signal ADR. For example, in the embodiment considered, the decoder 124 may set a write enable/chip select signal WENa in order to indicate that the configuration data client circuit 112a should read the data signal DATA when the address signal ADR corresponds to an address assigned to the configuration data client circuit 112a (and the data valid signal WEN is set). Similarly, the decoder 124 may set a write enable/chip select signal WENb in order to indicate that the configuration data client circuit 112b should read the data signal DATA when the address signal ADR corresponds to an address assigned to the configuration data client circuit 112b (and the data valid signal WEN is set), etc.

Thus, the configuration circuit 108a will sequentially read the configuration data packets and transmit the respective configuration data to the associated configuration data client circuit 112, which stored the content of the data signal DATA. Accordingly, the configuration data CD may be stored during the various production and development phase as a sequence of consecutive data packets/DCF frames. For example, this implies that, in case the one or more non-volatile memories 104 contain two or more data packets/DCF frames, which are addressed to the same configuration data client circuit 112, the configuration circuit 108a will transmit sequentially the respective configuration data of these two or more data packets/DCF frames to the same configuration data client circuit 112, and the configuration data client circuit 112 will overwrite the previous values, i.e., the configuration data client circuit 112 will only provide the last configuration data having been received.

Generally, due to the fact that the configuration data CD stored in the one or more non-volatile memories 104 may also be used to control the various security features of the processing system 10a, it is advantageous that the programmed configuration data CD cannot be altered anymore. For example, in various embodiments, each non-volatile memory 104 may be configured to inhibit write accesses to already programmed memory locations of the memory area(s) which may comprise configuration data, i.e., the non-volatile memory area(s) where the configuration data may be stored cannot be erased or re-programmed, thereby ensuring that configuration data CD already stored in the one or more non-volatile memories 104 may be altered within the non-volatile memory 104.

Generally, the use of plural DCF frames addressed to the same configuration data client circuit 112 may be useful in order to permit a recalibration of the processing system, e.g. by appending a DCF frame with new calibration data to the already existing configuration data CD in the non-volatile memory 104. In fact, in this way, the various calibration data will be read during the reset phase, but the respective configuration data client circuit 112 will only use the calibration data programmed last. Conversely, it may be rather dangerous when already activated security and/or safety functions could be deactivated by simply appending respective configuration data CD to the non-volatile memory 104.

Accordingly, in various embodiments, each configuration data client circuit 112 may be configured to permit or inhibit overwriting of previous configuration data. For example, possible solutions for controlling the write operations in a configuration data client circuit 112 are described in the Italian patent application 102018000001633, which is incorporated herein by reference for this purpose.

Thus, the arrangement described with respect to FIG. 4 provides an efficient solution for distributing configuration data CD within a processing system 10a, permitting also that the configuration data CD may be set by different entities (producer, software developer, etc.) without having to overwrite the previous configuration data in the non-volatile memory 104. Moreover, also the reconfiguration of previously written configuration data may be limited within each configuration data client circuit 112.

However, the arrangement does not take into account that the configuration data provided by the memory 104 may not correspond to the configuration data stored to the memory 104.

For example, the memory 104 may provide incorrect data due to errors in the data contained in the memory 104, e.g. due to corruption of the configuration data CD, or due to an intentional modification of the data stored in the memory 104. A possible solution to this problem is the use of an error-correcting code (ECC) memory. For example, in this case, the memory 104 comprises an error detection and/or correction circuit 1040 (see FIG. 4), which detects and possibly also corrects modifications in the data read from the memory.

However, the memory 104 itself may not operate correctly and may not provide at all configuration data or skip one or more configuration data. For example, this may happen when the communication between the data read circuit 1080 and the memory 104 is not operating correctly. For example, as mentioned before, the data read circuit 1080 may send an address signal to the memory 104 and the memory 104 may return the respective data signal containing the data stored at the address provided. Hence, an alteration of the address bus (both intentional, like in the case of an attack, or unintentional, like in the case of a malfunction) may result, e.g., in a reading of different data and/or skipping the reading of some configuration data. Similarly, also the data bus between the memory 104 and the data read circuit 1080 may not operate correctly. However, such malfunctions may not be detected by an error detection and/or correction circuit 1040, insofar as the data read from the memory for a given (incorrect) address are indeed correct and only the communication of the data and/or the address signal is affected by a malfunction.

However, in case some configuration data CD are not read correctly or skipped, there could be consequences for availability (the device might not work properly), quality (a wrong behavior could compromise the overall quality), safety (a wrong behavior could translate into a safety threat) and/or security (some security functions may be deactivated).

In this respect, Italian patent application 102018000002895, the content thereof being incorporated herein by reference for this purpose, describes embodiments able to verify whether the data read from the non-volatile memory 104 and/or transmitted to the configuration data client circuits 112 indeed corresponds to the data initially written to the non-volatile memory 104.

Figure 5A:
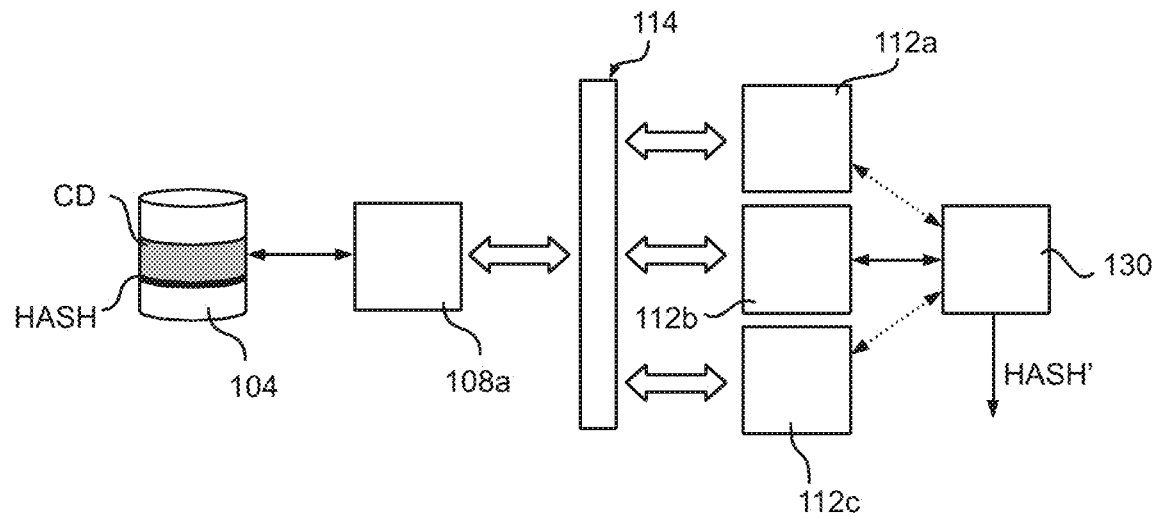
FIGS. 5A and 5B show embodiments for calculating signature data as a function of the configuration data transmitted to the configuration data client circuits of FIG. 3.

FIG. 5A shows a first embodiment of a modified processing system 10a, which essentially corresponds the architecture described with respect to FIG. 3. Accordingly, the respective description and the exemplary detailed embodiment of FIG. 4 also apply in this case.

Specifically, with respect to FIG. 3, the memory 104 does not only contain the configuration data CD, but also a respective signature HASH calculated as a function of the configuration data CD.

Generally, the term "signature" indicates that the respective signature data are calculated as a function of the configuration data. For example, a hashing function may be used for this purpose, such as MD5 or Secure Hash Algorithm (SHA), e.g. SHA-1 or SHA-256. Generally, the configuration data may also be encoded and/or encrypted, e.g. by using Advanced Encryption Standard (AES) or Data Encryption Standard (DES), and a subset of the encrypted data, e.g. the last data packet, may be used as signature field.

In the embodiment considered, the processing system 10a comprises moreover a signature calculation circuit 130 configured to recalculate the signature directly as a function of the configuration data read from the memory 104.

Specifically, in the embodiment shown in FIG. 5A, the signature calculation circuit 130 receives at input the configuration data having been stored in the internal registers of the data clients 112, i.e. each configuration data client circuit 112 provides the configuration data received not only to the associated hardware block(s) 110 but also the signature calculation circuit 130. Due to the sequential transmission of the configuration data packets to the configuration data client circuits 112, each configuration data client circuit 112 may thus signal sequentially that new data have been arrived and the signature calculation circuit 130 may read the configuration data from the configuration data client circuit having currently received configuration data, thereby recalculating a signature HASH' as a function of the configuration data received by the configuration data client circuits 112.

Figure 5B:
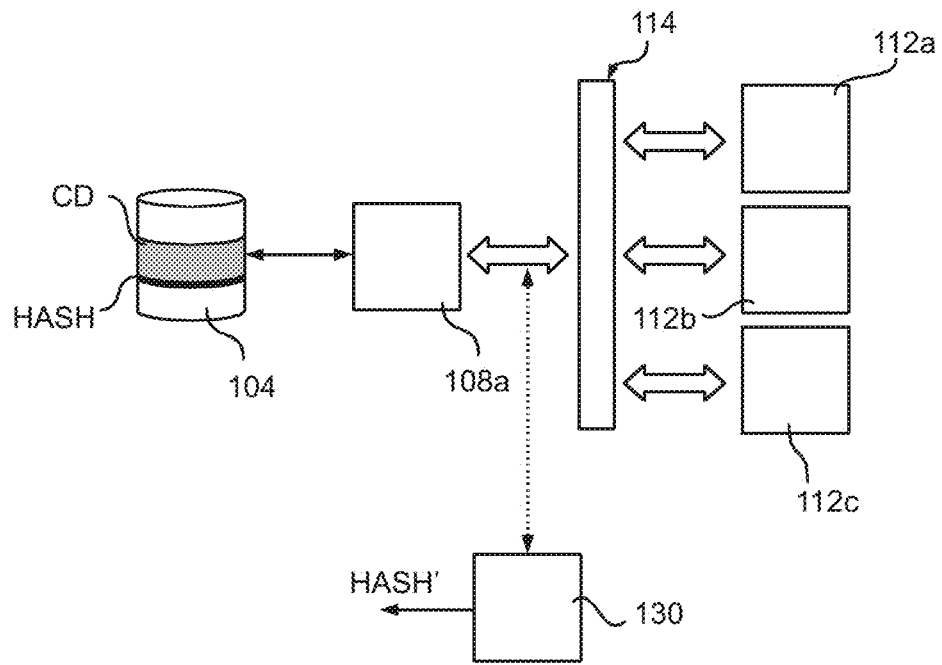

Conversely, FIG. 5B shows an embodiment, wherein the signature calculation circuit 130 receives at input the data transmitted to the configuration data client circuit, e.g. the signature calculation circuit 130 monitors the data transmitted on the communication channel 114, e.g. the data signal DATA of FIG. 4. Thus, assuming that the configuration data client circuits also receive the configuration data transmitted, also in this case, the signature calculation circuit may recalculate a signature HASH' as a function of the configuration data transmitted to the configuration data client circuits 112.

Thus, knowing the original signature HASH stored in the memory 104 and by recalculating a signature HASH' as a function of the configuration data CD provided to the configuration data client circuits 112, the processing system 10a may verify whether both signatures correspond.

Generally, the solution of FIG. 5A is preferably, insofar as indeed the data stored in the configuration data client circuits 112 are verified, thereby permitting a verification of all intermediate components from the memory 104 up to the configuration data client circuits 112.

Figure 6A:
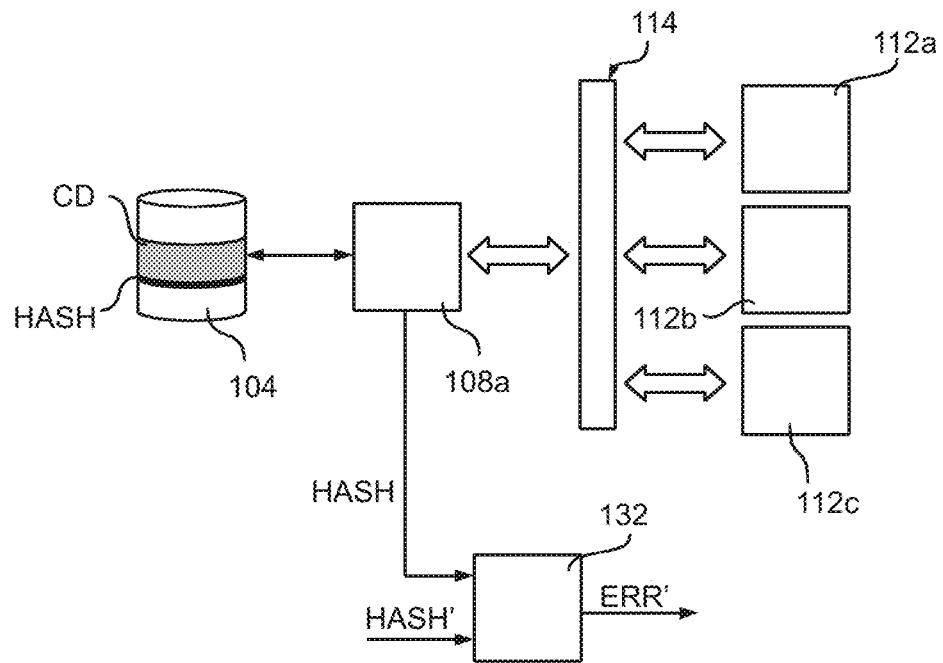
FIGS. 6A and 6B show embodiments for reading pre-calculated signature data from the non-volatile memory of FIG. 3.

FIG. 6A shows a first embodiment for verifying both signatures HASH and HASH'.

Specifically, in the embodiment considered, the configuration circuit 108a is configured to read the signature HASH from the memory 104 and provide the signature HASH directly to a signature verification circuit 132 configured to compare the signature HASH with the recalculated signature HASH'.

Figure 6B:
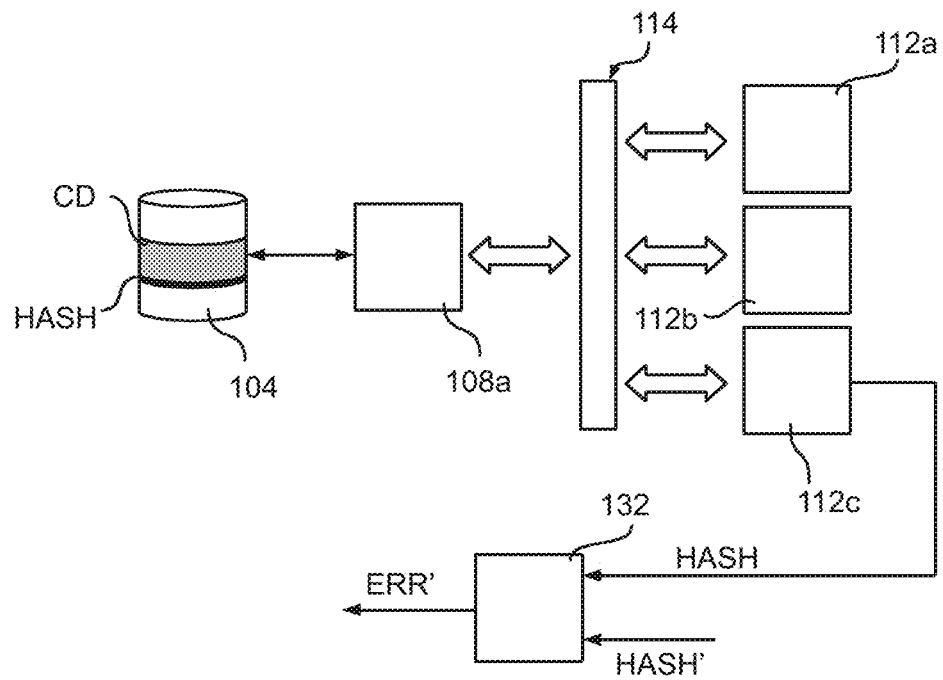

Conversely, FIG. 6B shows an embodiment, wherein the signature HASH is stored as one or more of the configuration data packets (in particular the last one of a respective set of configuration data). Moreover, one or more of the configuration data client circuits 112, e.g. the client 112c, represent configuration data client circuits of the signature verification circuit 132. Thus, by storing in the attribute field of the configuration data packets the address of the respective configuration data client circuit(s) 112, the configuration circuit 108a will read the signature HASH as a normal configuration data packet and will transmit the signature HASH via the communication channel 114 to the configuration data client circuit(s) associated with the signature verification circuit 132.

Accordingly, in both cases, the signature verification circuit 132 receives at input the signature HASH stored in the memory 104 and the signature HASH' recalculated by the signature calculation circuit 130 (see also FIGS. 5A and 5B). The circuit 132 may thus verify whether both signatures correspond and may generate an error signal ERR when the signatures do not correspond.

The solutions described with respect to FIGS. 5 and 6 are thus able to detect possible system malfunctions, hence satisfying availability and safety requirements. However, the inventor has observed that these solutions may not be enough to protect the processing system 10a also from malicious attacks aimed to voluntarily change the configuration data read, hence possibly being insufficient to satisfy also security requirements. For example, the processing system 10a may be unable to determine why the signature data do not correspond. In fact, even though assuming that the correct configuration data CD have been read from the memory 104, the data stored to the configuration data client circuits 112 may be incorrect for different reasons, such as:

an alteration of the address signal ADR,
an alteration of the transferred data DATA,
an alteration of the write enable signal WEN or the write enable/chip select signals WENa . . . WENc, and/or
an alteration of the data indeed stored to the register of the configuration data client circuit 112.

Moreover, the data stored to the register of the configuration data client circuit 112 may also be altered at a later stage, whereby the previous signature verification operation would not signal any error.

Finally, also the operation of the circuits 130 and/or 132 may be altered, which would render the signature verification rather useless.

Accordingly, the solution disclosed with respect to FIGS. 5 and 6 may mainly be used to verify the communication between the non-volatile memory 104 and the configuration circuit 108a in order to verify, e.g., whether the communication with the memory 104 is operating correct and/or to verify whether unaltered configuration data CD have been read from the memory 104. Conversely, the communication between the configuration circuit 108a and the configuration data client circuits 112 may not be analyzed in detail. Accordingly, a need is felt for a better analysis of this communication.

Figure 7:
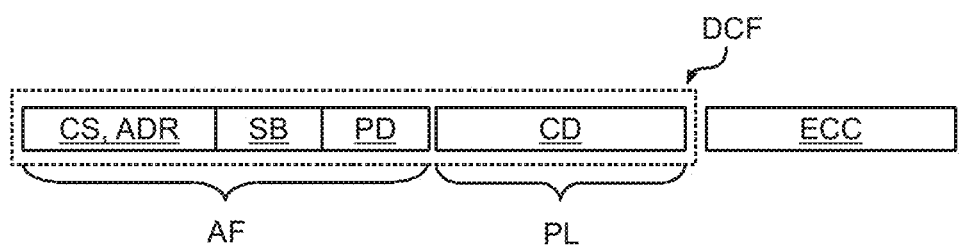
FIG. 7 shows an embodiment of the organization of the configuration data in the non-volatile memory.

FIG. 7 shows in this respect again the organization of the configuration data in the memory 104. Specifically, as mentioned before, in various embodiments, the configuration data CD are stored to the non-volatile memory in the form of data packets DCF. Specifically, the data packets DCF, e.g. having 64 bits, comprise an attribute field AF, e.g. having 32 bits, and a payload field PL, e.g. having 32 bits. Specifically, in the embodiments described in the foregoing, the payload corresponds to the configuration data CD transmitted via the data signal DATA. Conversely, the attribute field AF contains at least the address data ADR of the target configuration data client circuit to which the respective payload/data should be transmitted. For example, in various embodiments, the attribute field AF may comprise:

the address bits ADR used to identify the target configuration data client circuit 112;

optional chip select bits CS used to activate a certain group of configuration data client circuits 112;

an optional stop bit SB; and optional error detection data PD, such as one or more parity bits, calculated as a function of the respective data bits DATA.

Substantially, the optional chip select bits CS represent additional address data. However, while the address signal ADR (and also the data signal DATA) may be transmitted on a single bus, shared by all configuration data client circuits 112, each bit of the chip select bits CS may be routed separately via dedicated signals/lines CSi to a given sub-set of configuration data client circuits 112. Thus, in various embodiments, a group of configuration data client circuits 112 may be activated when a corresponding chip select bit CSi is set, and within the group of activated configuration data client circuits 112, the configuration data client circuit 112 that has associated the same address as the address signal ADR will store the data transmitted via the data signal DATA.

Conversely, the optional stop bit SB may indicate the end of the configuration data CD. Specifically, as mentioned before, the DCF records are programmed consecutively in the non-volatile memory 104 and the configuration circuit 108a reads them until a last DCF record is reached. Accordingly, as described with respect to FIG. 4, when the configuration circuit 108a reads a DCF element from the non-volatile memory 104, the configuration circuit 108a received (via a single o plural consecutive read operation) a complete configuration data packet, and uses the address bits ADR (and the optional chip select bits CS) to select/activate a specific target configuration data client circuit 112 and the data bits DATA as the value to be written to the target configuration data client circuit 112. Thus, reading may be interrupted when the next DCF record is empty (i.e. when unprogrammed data are read from the next memory slot) and/or when the optional stop bit SB of a given (last) DCF frame is set.

Figure 8A:
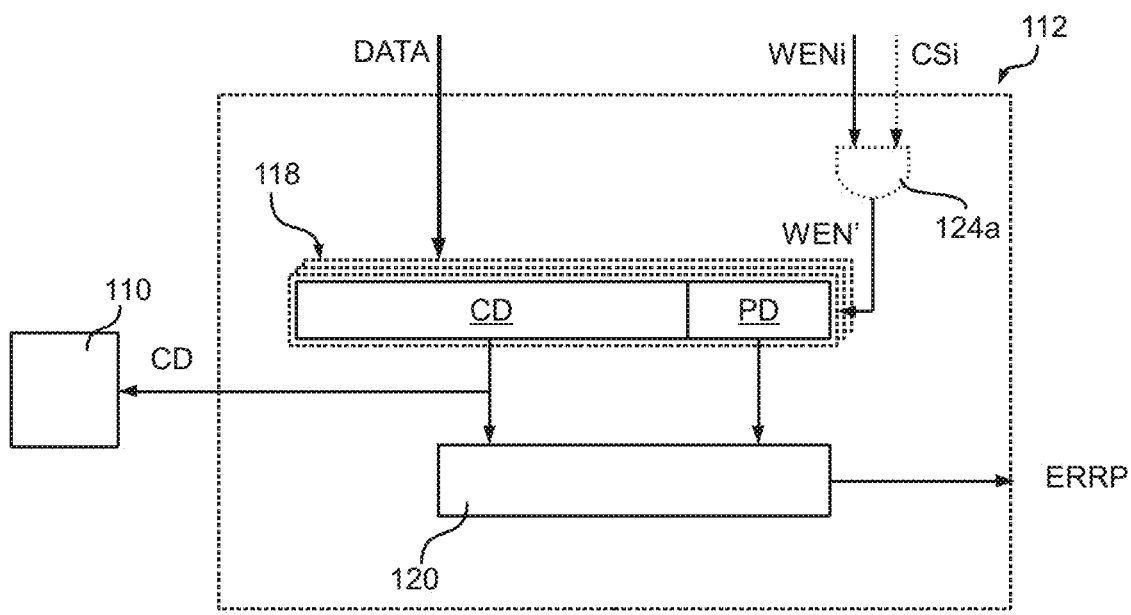
FIGS. 8A and 8B show embodiments of the configuration data client circuit of FIG. 3.
Figure 8B:
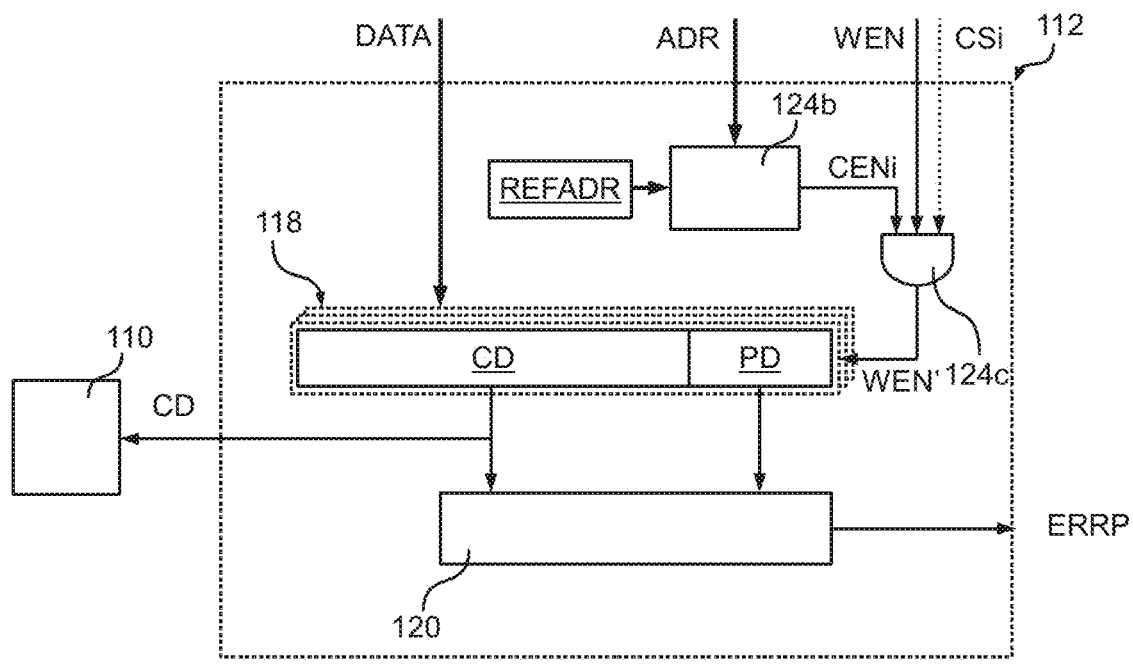

FIGS. 8A and 8B show is this respect possible embodiments of a configuration data client circuit 112.

Specifically, the configuration data client circuit 112 comprises a register 118, e.g. in the form of flip-flops or latches, configured to store the data received via the data signal DATA. For example, in the embodiments shown in FIGS. 8A and 8B, the data provided via the data signal DATA are stored in the register 118 when the address signal ADR corresponds to the address associated with the configuration data client circuit 112 and when the signal WEN indicates that the data signal DATA contains valid data. Optionally, also the configuration data client circuit 112 may also verify whether the optional chip select signal CS indicates that the configuration data client circuit 112 belongs to a group of activated configuration data client circuits 112.

For example, the embodiment shown in FIG. 8A refers to the fact that an address decoder 124 (see FIG. 4) is used to generate a plurality of write enable/chip select signals WENa . . . WENc, wherein a respective write enable signal WENi is set when the address signal ADR corresponds to a respective address. Thus, in the absence of further chip select bits CS, each write enable signal WENi may be used as write enable signal WEN' for the register 118 of a given configuration data client circuit 112.

Conversely, when using also further chip select bits CS, each bit CSi of the chip select bits CS may be used to activate only a sub-set of the configuration data client circuits. For example, this is schematically shown in FIG. 8a, where each configuration data client circuit 112 receives at input both a respective write enable signal WENi (provided by the address decoder 124) and a respective bit CSi of the chip select bits CS. For example, in the embodiment considered, the write enable signal WEN' for the register 118 may be generated in this case via a logic gate 124a, such as an AND gate, receiving at input the write enable signal WENi and the chip select bit CSi.

Conversely, FIG. 8B shows an embodiment, wherein the address decoder 124 is omitted and each configuration data client circuit 112 verifies autonomously whether the address signal ADR corresponds to a reference address REFADR (which may be hardwired) associated with the configuration data client circuit 112. Accordingly, in this case a comparator circuit 124b may generate the chip enable signal CENi for the register 118 directly as a function of the address signal ADR and the reference address REFADR, i.e. the chip enable signal CENi is set when the address signal ADR corresponds to the reference address REFADR.

For example, in the absence of further chip select bits CS, the write enable signal WEN' for the register 118 may be generated via a logic gate 124c, such as an AND gate, receiving at input the chip enable signal CENi and the write enable signal WEN.

However, similar to the embodiment shown in FIG. 8A, the configuration data client circuit 112 may also take into account a further chip select bit CSi used to activate a sub-set of the configuration data client circuits 112. For example, in this case, the logic gate 124c, such as an AND gate, may also receive at input the chip select signal CSi.

Thus, generally, the content of the data signal DATA is stored to the register 118 when the content of the address signal ADR corresponds to the address associated with the respective configuration data client circuit 112, the write enable signal WEN is set and optionally when the respective further chip select bit CSi is set, wherein a given combination of address bits ADR and chip select bits CS (when used) univocally identifies a given configuration data client circuit 112.

Essentially, in the embodiment shown in FIG. 8B, instead of using a centralized address decoder 124, the respective portion of this address decoder 124 is integrated directly in each configuration data client circuit in the form of a comparator circuit 124b.

As mentioned before, in various embodiments, the data received via the data signal DATA may not contain only the configuration data CD, but also error detection data PD, such as one or more parity bits. Accordingly, in various embodiments, the register 118 may store both the configuration data CD and the error detection data PD.

Generally, while in the presently considered embodiment the error detection data PD are stored in the attribute field AF, the error detection data PD could also be stored directly in the payload field PF. However, in both cases the configuration data CD and the error detection data PD are preferably transferred via the data signal DATA.

As described in the foregoing, the configuration data CD are provided to one or more blocks 110 of the processing system. Moreover, in the embodiment considered, both the configuration data CD and the error detection data PD stored to the register 118 are provided also to an error detection circuit 120 configured to recalculate the error detection data as a function of the configuration data CD and verify whether the recalculated error detection data correspond to the error detection data PD. For example, the circuit 120 may generate an error signal ERRP when the error detection data do not correspond. Accordingly, in such an architecture, each configuration data client circuit 112 may verify whether the transmitted configuration data CD are also valid.

As schematically shown in FIGS. 8A and 8B, in various embodiments, each register 118 may indeed be implemented with a plurality of registers. Specifically, in various embodiments, the same bit-sequence of the configuration data CD is stored to three registers and the signal provided to the associated circuit no is generated by performing a decision bases on a triple-voted decision, i.e. the signal corresponds to the value stored in at least two of the three registers. Also any greater (preferably odd) number of registers may be used. For example, in various embodiments, in addition or as an alternative to the verification of the error bits PD, the circuit 120 may set the error signal ERRP when the parallel registers 118 do not have exactly the same value. In various embodiments, also a plurality of registers may be used for the error detection bits PD.

As shown in FIG. 7, independently from the error detection bits PD possibly used by the configuration data client circuits 112, each DCF record may also have associated a plurality of error correction code (ECC) bits, which may be used to detect and possible repair errors in the data read from the non-volatile memory 104. For example, for a possible implementation of a memory having an ECC function, reference can be made to Italian patent application 102018000003233, which is incorporated herein by reference.

For example, typically with each word of data read from the memory 104 may be associated a respective set of ECC bits calculated as a function of the respective data. Thus, for example, in a 64-bit memory a single set of ECC bits may be stored in the memory 104 for each complete DCF frame, while in a 32-bit memory a first set of ECC bits may be stored for the attribute field AF and a second set of ECC bits may be stored for the payload field PF. However, in both cases a plurality of ECC bits are associated with a complete DCF frame and only the calculation of the ECC bits varies.

As described in the foregoing, various embodiments of the present disclosure relate to solutions configured to detect an alteration, during the data exchange between the configuration circuit 108a and the configuration data client circuits 112, of the address signal ADR and/or the data signal DATA and/or the optional chip select signal CS. Various embodiments are also able to detect an alteration of the data stored in the register 118 of a configuration data client circuit 112, i.e. after the configuration phase has been terminated.

FIG. 9 shows again schematically the arrangement shown in FIG. 3, wherein the hardware configuration circuit 108a reads sequentially data packets/DCF frames DCFi of the configuration data CD (comprised of a sequence of data packets $DCF_1 \ldots DCF_n$) from the memory 104 and transmits the data packet read DCFi via a suitable communication system 114, to a respective configuration data client circuit 112 (essentially by using the address signal ADR and the optional chip select data CS included in the data packet DCFi).

In the embodiment considered, the processing system 10a comprises however also a second communication system 114b (being rather independent from the communication system 114) for reading the data DCFi' stored by a given configuration data client circuit 112.

Accordingly, in the embodiment considered, the configuration circuit 108a may compare at a digital comparator circuit 1090 at least in part the data DCFi read from non-volatile memory 104 with the data DCFi read from the configuration data client circuit 112 associated with the address data indicated in the data DCFi and generate an error signal when the data do not correspond. Preferably, the data DCFi/DCFi' do not comprise only the content of the payload field PF, but also the address field AF (in particular the address ADR and optionally the chip select data CS), thereby permitting a verification of the address data.

In various embodiments, the configuration circuit 108a may also comprise an ECC verification circuit 1092 configured to read the error detection/correction data ECCi associated with the data packet DCFi from the memory 104, recalculate the error detection/correction data based on the data DCFi' read from the configuration data client circuit 112 and generate an error signal when the error detection/correction data do not correspond.

Figure 10:
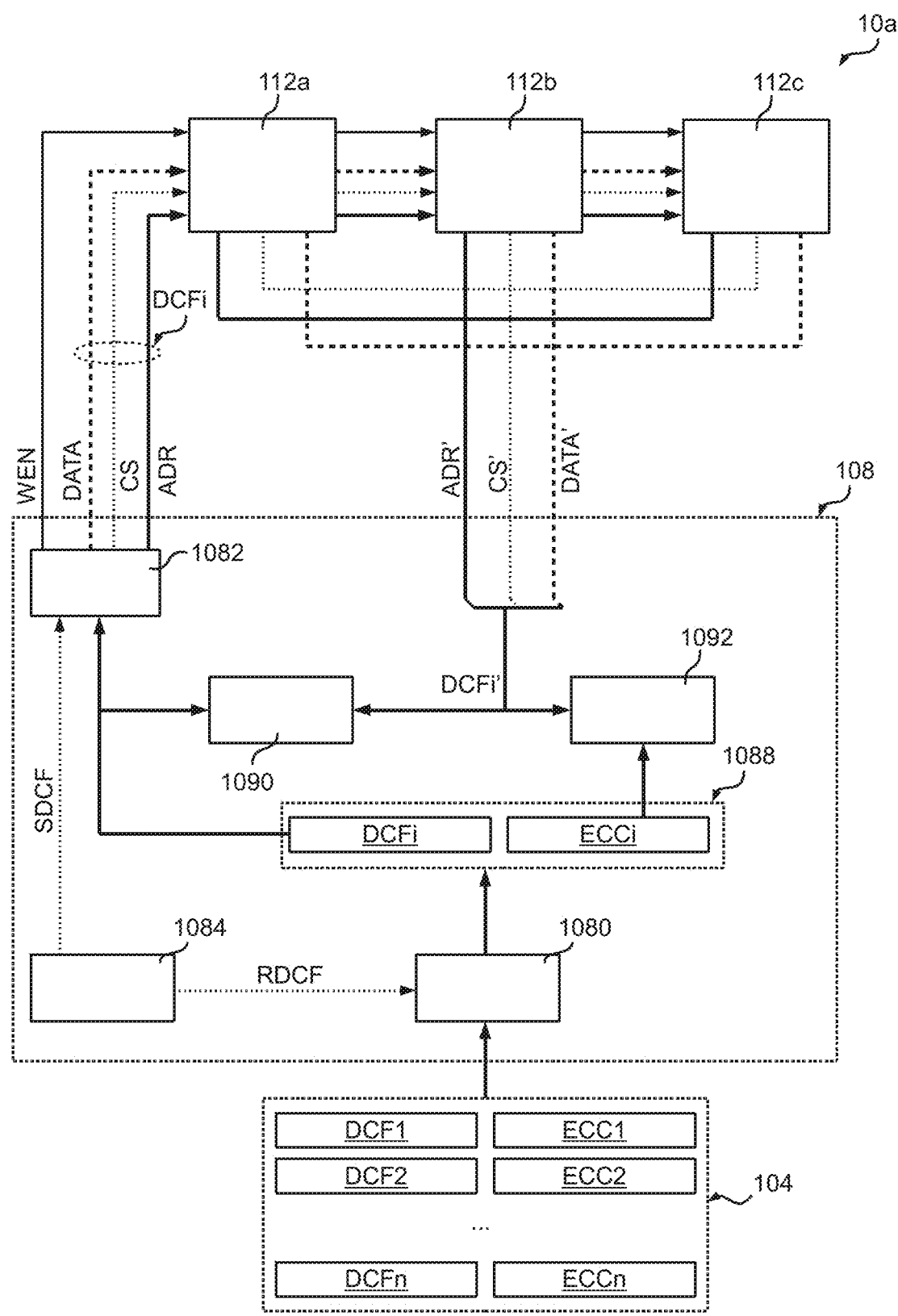
FIG. 10 shows an embodiment of the processing system of FIG. 9.

FIG. 10 shows in this respect a possible embodiment of the configuration circuit 108a and the communication systems 114 and 114b.

Specifically, in the embodiment considered the data read circuit 1080 is again configured to read the configuration data CD from the non-volatile memory 104. Specifically, in various embodiments, the data read circuit 1080 does not read only a given data frame DCFi but also the associated error detection/correction data ECCi. In the embodiment considered, the data read circuit 1080 stores the data frame DCFi and optionally the error detection/correction data ECCi in a register 1088, e.g. implemented with flip-flops or latches.

In the embodiment considered, the data frame DCFi stored to the register 1088 is provided to the dispatch circuit 1082. Generally, the dispatch circuit 1082 could also receive the data frame DCFi directly from the data read circuit 1080.

In the embodiment considered, the dispatch circuit generates then the address signal ADR, the data signal DATA and optionally the chip select signal CS as a function of the content of the data frame DCFi. For example, as described in the foregoing, the data frame DCFi may already contain the address bits and chip select bits to be applied to the signals ADR and CS. Similarly, the data frame DCFi may contain the configuration data CD and optionally the error detection data PD to be applied to the data signal DATA.

In the embodiment considered, the dispatch circuit 1082 also sets the write enable signal WEN in order to indicate that the content of the data signal DATA should be stored by the target configuration data client circuit 112 univocally identified by means of the address signal ADR and optionally the chip select signal CS.

Accordingly, in case the address signal ADR and the optional chip select signal correspond to the address data associated with a given target configuration data client circuit 112, this configuration data client circuit 112 will store the content of the data signal DATA as described with respect to FIGS. 8A and 8B. Specifically, while not explicitly shown in FIG. 10, the processing system 10*a* may also comprise for this purpose an address decoder 124 as described with respect to FIGS. 4 and 8A, or each configuration data client circuit may autonomously monitor the address signal ADR as described with respect to FIG. 8B. Thus, essentially the signals ADR, CS, DATA and WEN implement a shared communication bus representing the communication system 140 of FIG. 9.

Figure 9:
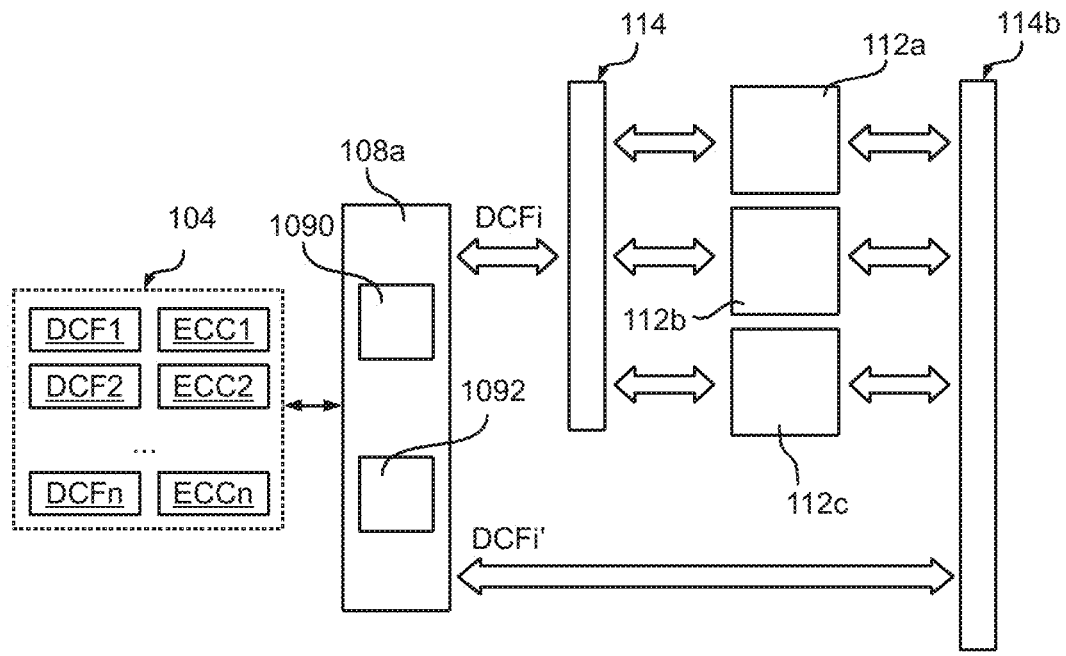
FIG. 9 shows an embodiment of a processing system configured to verify whether the correct configuration data have been transmitted to the configuration data client circuits.

In the embodiment considered, the configuration data client circuits 112 are also connected to a second communication bus (i.e. the communication system 140*b* of FIG. 9). Specifically, in the embodiment this second communication system is implemented:

via the address signal ADR, which essentially provides a read address to the configuration data client circuits 112 in order to select a target configuration data client circuit 112; and a common data bus comprising at least lines for receiving via a data signal DATA' the content of the register 118 of the target configuration data client circuit.

Thus, when transmitting given configuration data via the signals ADR/CS, DATA and WEN to a given target configuration data client circuit 112, the data signal DATA' will provide the date indeed stored to the target configuration data client circuit.

Figure 11:
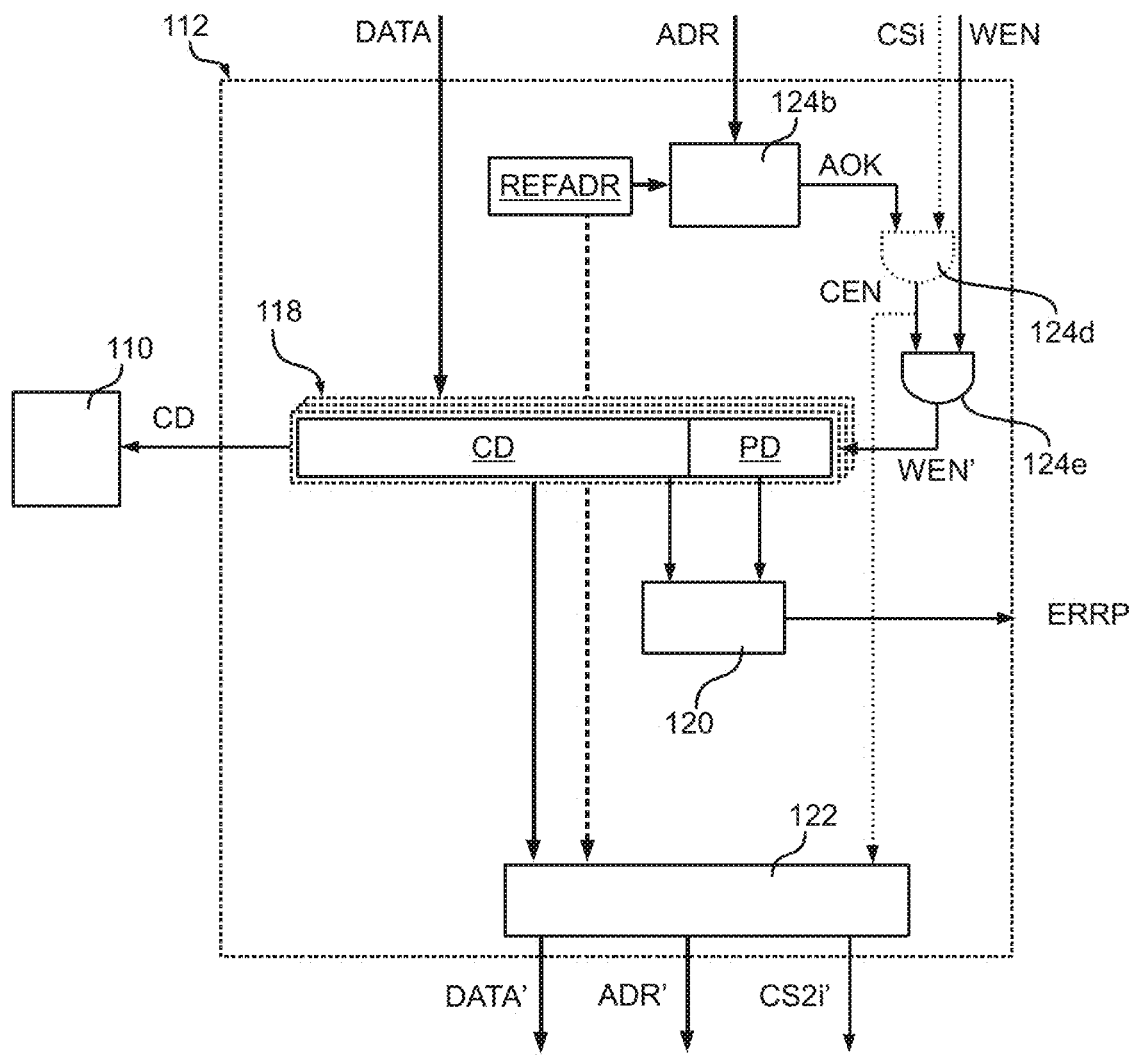
FIG. 11 show embodiments of the configuration client of FIG. 10.

For example, this is schematically shown in FIG. 11, which is essentially based on the structure of the configuration data client circuit 112 shown in FIG. 8B.

Specifically, in the embodiment considered, the configuration data client circuit 112 comprises again a comparator circuit 124*b*, configured to compare the address signal ADR with a reference address REFADR. For example, in the embodiment considered, the comparator circuit 124*b* sets a comparison signal AOK when the address signal ADR corresponds to the reference address REFADR. In the absence of an additional chip select signal CS, the signal AOK indicates thus that the configuration data client circuit 112 has been selected. Conversely, when using an additional chip select signal CS, an additional logic gate 124*d*, such as an AND gate, may be used to generate an enable signal CEN by combining the signal AOK with the respective chip select bit CSi, i.e. the signal CEN indicates that the configuration data client circuit 112 has been selected.

Thus, similar to the description of FIG. 8B, the write enable signal WEN' for the register 118 may be generated by an additional logic gate 124*c*, such as an AND gate, by combining the signal AOK or CEN (when using also the chip select signal CS) with the respective write enable signal WEN.

Accordingly, when the address data (ADR and optionally CS) univocally identify the configuration data client circuit 112 and the write enable signal WEN is set, the configuration data client circuit 112 will store the content of the data signal DATA to the register 118.

In the embodiment considered, the content of the register 118 and the signal AOK (when not using the additional chip select signal CS) or CEN (when using also the chip select signal CS) are provided to a transmitter circuit 122. Specifically, the transmitter circuit 122 is configured to set the signal DATA' to the content of the register 118 when the signal AOK or CEN (when using also the chip select signal CS) indicates that the address data (address signal ADR and optionally also the chip select signal CS) indicate that the respective configuration data client circuit 112 has been selected. Thus, in the embodiment considered, the transmitter circuit 122 will transmit the content of the register 118 irrespective of the value of the write enable signal WEN, and the write enable signal WEN is used only to indicate whether the content of the data signal DATA should also be stored to the register 118.

In the embodiments shown in FIGS. 10 and 11, the transmitter circuit 112 is also configured to transmit the address data associated with the configuration data client circuit selected via the address signal ADR and optionally the chip select signal CS, i.e. the transmitter circuit is configured to generate a signal ADR' providing the content of the address signal ADR and optionally a signal CS' providing the content of the chip select signal CS, in particular the bit CSi.

For example, in various embodiments, insofar as the address data are constant for a given configuration data client circuit 112, the transmitter circuit 112 may set the signal ADR' to the value of the reference address REFADR and optional the signal CS' to a fixed chip select value when the enable signal AOK or CEN indicates that the configuration data client circuit 112 has been selected.

Accordingly, in the embodiment considered, the complete DCF record DCFi is read by the data read circuit 1080, and at least the address data (ADR and optionally CS) and the data to be transmitted via the data signal DATA (CD and optionally PD) are stored in the register 1088. The data stored in the register 1088 are then transmitted via the dispatch circuit 1082 to a respective target configuration data client circuit 112 as indicated by the address data (ADR and optionally CS). Moreover, the dispatch circuit 1082 sets the write enable signal WEN in order to indicate that the selected configuration data client circuit should store the content of the data signal DATA.

In turn, the target configuration data client circuit 112 selected by the address data (ADR and optionally CS) stores the content of the data signal DATA to the register 118 and transmits (via the transmitter circuit 122) the data DATA' stored in the register 118 to the configuration circuit 108*a*. Optionally, the selected target configuration data client circuit 112 may transmit (via the transmitter circuit 122) also the address data (ADR and optionally CS) associated with the configuration data client circuit 112. Accordingly, in various embodiments, the configuration circuit 108*a* may transmit the complete DCF record DCFi read from the memory 104 to the configuration data client circuits 112 and the configuration circuit 108*a* may receive a complete DCF record DCFi' from the configuration data client circuits 112.

Essentially, the embodiment of the processing system 10*a* shown in FIG. 10 comprises:

an address bus ADR (and optionally the additional chip select signal CS), which is set by the dispatch circuit 1082 in order to indicate the target address of a target configuration data client circuit 112;

a first data bus comprising the data signal DATA, which is set by the dispatch circuit 1082 in order to indicate the data to be stored by the target configuration data client circuit 112 selected via the address bus;

a write enable signal indicating whether the target configuration data client circuit 112 selected via the address bus should store the data provided via the first data bus; and a second data bus comprising the signal DATA' and optionally ADR' and CS', which is set by the target configuration data client circuit 112 selected via the address bus in order to transmit the configuration data stored by the target configuration data client circuit 112 to the configuration circuit 108a.

Specifically, in the embodiment considered, the physical lines used to implement the first and second data bus are independent from each other.

In the embodiment considered, the content of the data signal DATA (as e.g. stored in the register 1088) and the data signal DATA' is provided to a comparator circuit bow. Specifically, the comparator circuit 1090 may generate an error signal when the data signals DATA and DATA' do not correspond. In various embodiments, the comparator circuit may also take into account the address data ADR/CS and ADR'/CS', i.e. the comparator circuit bow may generate an error signal when the address data ADR/CS and ADR'/CS' do not correspond.

In various embodiments, the data read circuit 1080 may also read from the memory 104 the error detection/correction data ECCi associated with the current DCF record DCFi and store the data ECCi to the register 1088. In this case, a circuit 1092 may reconstruct the complete DCF record DCFi' from the signals ADR', CS' and DATA' and recalculate the respective error detection/correction data. Next, the circuit 1092 may compare the calculated error detection/correction data with the data ECCi stored to the register 1088, i.e. the circuit 1092 may generate an error signal when the calculated error detection/correction data and the error detection/correction data ECCi do not correspond. For example, insofar as the optional stop bit SB may not be transmitted to the configuration data client circuits, the circuit 1092 may reconstruct the DCF record DCFi' by using the stop bit SB included in the original DCF record DCFi.

In various embodiments, the state control circuit 1084 may then generate two signals:

a read signal RDCF provided to the data read circuit 1080 in order to indicate that the data read circuit 1080 should read the configuration data from the memory 104; and a write signal SDCF provided to the dispatch circuit 1082 in order to indicate that the dispatch circuit 1082 should also set the write enable signal WEN.

In fact, in this way, in response to a reset event (as indicated e.g. by the reset circuit 116) the state control circuit 1084 may set both the signal RDCF and SDCF. In response to these signals, the data read circuit 1080 reads the configuration data CD from the memory 104 and the dispatch circuit 1082 sets the address signal ADR (and the optional chip select signal CS) and the data signal DATA, thereby transmitting the configuration data CD to a target configuration data client circuit 112, while also setting the write enable signal WEN. Accordingly, the target configuration data client circuit 112 selected by the address data stores the configuration data CD and transmit (at least) the stored configuration data CD back to the configuration circuit 108a. At this point, the circuit 1090 (and optionally the circuit 1092) may verify whether the data received from the configuration data client circuit are correct.

Conversely, in response to a further event (e.g., in response to a diagnostic request, e.g. requested by the processing unit 102) the state control circuit 1084 may set only the signal RDCF (and the signal SDCF is not set). In response to the signal RDCF, the data read circuit 1080 reads again the configuration data CD from the memory 104. However, in case the signal SDCF is not set, the dispatch circuit 1082 sets the address signal ADR (and the optional chip select signal CS), thereby selecting a given target configuration data client circuit 112, but the write enable signal WEN is not set. Accordingly, the target configuration data client circuit 112 selected by the address data does not update the configuration data in the register 118 and transmit (at least) the already stored configuration data CD back to the configuration circuit 108a. At this point, the circuit 1090 (and optionally the circuit 1092) may again verify whether the data received from the configuration data client circuit are correct.

The system shown in FIG. 10 is thus able to check, during the configuration phase happening in response to a reset, whether the data stored by the configuration data client circuits 112 corresponds to the original data being read from the non-volatile memory 104. Moreover, the configuration circuit 108a may check whether the latched data are congruent with the ECC data. In addition, the proposed solution offers the possibility to run a configuration data check during run-time. For example, in this way, the application executed by the processing unit 102 may start a check of the DCF data latched by the configuration data client circuit 112 against the original data stored in the non-volatile memory 104, without the need to over-write the data stored by the configuration data client circuits 112.

Generally, the described mechanism for verifying the communication between the configuration circuit 108a and the configuration data client circuits 112 may also be combined with the signature verification operation described with respect to FIGS. 5 and 6, which permits to verify whether correct configuration data CD have been read from the non-volatile memory 104. For example, due to the fact that the communication system 104b (see, e.g., FIGS. 9, 10 and 11) already permits to read the configuration data CD transmitted to the configuration data client circuits 112, this communication system may be used to provide the configuration data CD to the signature calculation circuit 130 as shown in FIG. 5A. Conversely, insofar as the configuration circuit 108a may also store the configuration data read from the memory 104 internally in the register 1088 (see FIG. 10), the signature calculation circuit 130 may also calculate in line with FIG. 5B the signature HASH' as a function of the data stored to the register 1088.

As mentioned before, in case the data are not correct, the circuit 1090 and/or 1092 may generate an error signal. For example, the error signal may be provided to a hardware error handler circuit and/or the processing unit 102.

In various embodiments, the solution may further be improved by implementing the register 118 of one or more of the configuration data client circuits 112 with plural redundant registers. For example, the configuration data client circuits 112 configured to store security and/or safety relevant configuration data may comprise redundant registers 118. In order to make the protection even more robust, the configuration data client circuits 112 having redundant registers 118 may also provide an error signal indicating whether all the parallel flip-flops/latches have exactly the same value or whether at least one of them has been altered. For example, this error signal may be used to monitor a possible tampering attack.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A circuit comprising:
   a data read circuit;
   a data write circuit;
   a register; and
   a control circuit;
   wherein the circuit is configured to:
      sequentially read data packets from a non-volatile memory, each data packet comprising an address of a target configuration data client circuit and configuration data to be transmitted to the target configuration data client circuit;
      for a first data packet, store the configuration data and the address included in the data packet in the register;
      select a target configuration data client circuit as a function of the address included in the first data packet;
      transmit a first data signal that includes the configuration data included in the first data packet to the target configuration data client circuit;
      receive a second data signal that includes configuration data stored in the target configuration data client circuit and the address associated with the target configuration data client circuit;
      compare the configuration data and address received from the target configuration data client circuit with the configuration data and address stored in the register, respectively; and
      in response to the comparison, generate an error signal when the configuration data and address received from the target configuration data client circuit do not correspond to the configuration data and address stored in the register.

2. The circuit according to claim 1, wherein the circuit is further configured to:
   select the target configuration data client circuit as a function of the address included in the first data packet; and
   in response to a control signal, transmit the first data signal having the configuration data included in the data packet to the target configuration data client circuit when the configuration data and address received from the target configuration data client circuit correspond to the configuration data and address stored in the register.

3. The circuit according to claim 2, wherein the circuit is further configured to transmit the configuration data included in the first data packet to the target configuration data client circuit by applying the address included in the data packet to an address signal and, when the control signal is set, setting a write enable signal.

4. The circuit according to claim 1, wherein error correction code data for each data packet is stored in the non-volatile memory and wherein the circuit is further configured to:
   read the error correction code data stored for the first data packet;
   calculate error correction code data as a function of the configuration data and address received from the target configuration data client circuit;
   compare the error correction code data read from the non-volatile memory with the calculated error correction code data; and
   in response to the comparison, generate the error signal when the error correction code data read from the non-volatile memory does not correspond to the calculated error correction code data.

5. The circuit according to claim 1, wherein the non-volatile memory comprises signature data calculated as a function of the configuration data stored to the non-volatile memory and wherein the circuit is further configured to:
   calculate signature data as a function of the configuration data read from the non-volatile memory, the first data signal transmitted to target configuration data client circuit, or the second data signal received from target configuration data client circuit; and
   compare the signature data stored to the non-volatile memory with the calculated signature data; and
   generate a further error signal when the signature data stored to the non-volatile memory does not correspond to the calculated signature data.

6. A processing system comprising:
   a plurality of configuration data client circuits, each configuration data client circuit comprising a register, wherein a respective address is associated with each configuration data client circuit and wherein each configuration data client circuit is configured to receive a first data signal providing configuration data addressed to the address associated with the configuration data client circuit, and to store the received configuration data in the register of the configuration data client circuit;
   a hardware circuit configured to change operation as a function of the configuration data stored in the registers of the plurality of configuration data client circuits;
   a non-volatile memory comprising the configuration data for the hardware circuit; and
   a hardware configuration circuit configured to read the configuration data from the non-volatile memory and to transmit the configuration data to the plurality of configuration data client circuits;
   wherein the configuration data are stored in the non-volatile memory in the form of data packets comprising an address of a configuration data client circuit selected from the plurality of configuration data client circuits and the respective configuration data to be transmitted to the selected configuration data client circuit;
   wherein each configuration data client circuit comprises a transmitter circuit configured to transmit a second data signal containing the configuration data stored in the respective register and the address associated with the configuration data client circuit to the hardware configuration circuit; and
   wherein the hardware configuration circuit comprises a further register and is configured to sequentially read the data packets from the non-volatile memory, and, for at least one of the data packets, to:
   store the configuration data and the address included in each data packet in the further register;
   select a target configuration data client circuit as a function of the address included in the data packet;
   transmit the first data signal having the configuration data included in the data packet to the target configuration data client circuit;
   receive the second data signal having the configuration data stored in the register of the target configuration data client circuit and the respective address associated with the target configuration data client circuit;

compare the configuration data and address received from the target configuration data client circuit with the configuration data and address stored in the further register, respectively; and in response to the comparison, generate an error signal when the configuration data and address received from the target configuration data client circuit do not correspond to the configuration data and address stored in the further register.

7. The processing system according to claim 6, wherein the hardware configuration circuit comprises:

a data read circuit configured to, in response to a first control signal, sequentially read the data packets from the non-volatile memory and to store the configuration data and the address included in the data packet in the further register;

a dispatch circuit configured to select the target configuration data client circuit as a function of the address included in the data packet, and, in response to a second control signal, transmit the first data signal having the configuration data included in the data packet to the target configuration data client circuit; and a state control circuit configured to set the first and second control signal as a function of a reset signal.

8. The processing system according to claim 7, wherein the dispatch circuit is configured to transmit the configuration data included in the data packet to the target configuration data client circuit by applying the address included in the data packet to an address signal and, when the second control signal is set, setting a write enable signal.

9. The processing system according to claim 8, wherein each configuration data client circuit is configured to, when the write enable signal is set, store the configuration data received in the register of the configuration data client circuit.

10. The processing system according to claim 9, wherein each configuration data client circuit is configured to receive via the first data signal configuration data addressed to the address associated with the configuration data client circuit by:

comparing the address signal with a reference address signal identifying the address associated with the configuration data client circuit;

setting an address verification signal when the comparison indicates that the address signal corresponds to the reference address signal; and storing the configuration data received in the register of the configuration data client circuit when the write enable signal and the address verification signal are set.

11. The processing system according to claim 10, wherein the transmitter circuit is configured to transmit the configuration data stored in the respective register and the address associated with the configuration data client circuit as a function of the address verification signal.

12. The processing system according to claim 6, wherein at least one of the configuration data client circuits comprises a register implemented with a plurality of redundant flip-flops or latches.

13. The processing system according to claim 6, wherein error correction code data for each data packet is stored in the non-volatile memory, and wherein the hardware configuration circuit is, for at least one of the data packets, configured to:

read the error correction code data stored for the respective data packets;

calculate error correction code data as a function of the configuration data and address received from the target configuration data client circuit;

compare the error correction code data read from the non-volatile memory with the calculated error correction code data; and in response to the comparison, generate the error signal when the error correction code data read from the non-volatile memory do not correspond to the calculated error correction code data.

14. The processing system according to claim 6, wherein the non-volatile memory comprises signature data calculated as a function of the configuration data stored to the non-volatile memory, and wherein the processing system comprises:

a signature calculation circuit configured to calculate signature data as a function of the configuration data read from the non-volatile memory, the first data signal to the configuration data client circuits, or the second data signal from the configuration data client circuits; and a signature verification circuit configured to compare the signature data stored to the non-volatile memory with the signature data calculated by the signature calculation circuit, and to generate a further error signal when the signature data stored to the non-volatile memory do not correspond to the signature data calculated by the signature calculation circuit.

15. The processing system according to claim 6, wherein the processing system in integrated in a micro-controller.

16. A method of operating a processing system that includes a non-volatile memory storing configuration data in the form of data packets, each data packet comprising an address of a target configuration data client circuit and configuration data to be transmitted to the target configuration data client circuit, the method comprising:

sequentially reading the data packets from the non-volatile memory;

for a first packets storing the configuration data and the address included in the data packet in a register;

selecting a target configuration data client circuit as a function of the address included in the first data packet;

transmitting a first data signal that includes the configuration data included in the first data packet to the target configuration data client circuit;

receiving via a second data signal the configuration data stored in the target configuration data client circuit and the address associated with the target configuration data client circuit;

comparing the configuration data and address received from the target configuration data client circuit with the configuration data and address stored in the register, respectively; and in response to the comparison, generating an error signal when the configuration data and address received from the target configuration data client circuit do not correspond to the configuration data and address stored in the register.

17. The method according to claim 16, further comprising:

selecting the target configuration data client circuit as a function of the address included in the first data packet; and in response to a control signal, transmitting the first data signal having the configuration data included in the data packet to the target configuration data client circuit when the configuration data and address received from the target configuration data client circuit correspond to the configuration data and address stored in the register.

18. The method according to claim 17, further comprising transmitting the configuration data included in the first data packet to the target configuration data client circuit by applying the address included in the data packet to an address signal and, when the control signal is set, setting a write enable signal.

19. The method according to claim 16, wherein error correction code data for each data packet is stored in the non-volatile memory, the method further comprising:
   reading the error correction code data stored for the first data packet;
   calculating error correction code data as a function of the configuration data and address received from the target configuration data client circuit;
   comparing the error correction code data read from the non-volatile memory with the calculated error correction code data; and
   in response to the comparison, generating the error signal when the error correction code data read from the non-volatile memory does not correspond to the calculated error correction code data.

20. The method according to claim 16, wherein the non-volatile memory comprises signature data calculated as a function of the configuration data stored to the non-volatile memory, the method further comprising:
   calculating signature data as a function of the configuration data read from the non-volatile memory, the first data signal transmitted to target configuration data client circuit, or the second data signal received from target configuration data client circuit; and
   comparing the signature data stored to the non-volatile memory with the calculated signature data; and
   generating a further error signal when the signature data stored to the non-volatile memory does not correspond to the calculated signature data.

* * * * *